United States Patent [19]

Gallant

[11] Patent Number: 5,312,191
[45] Date of Patent: May 17, 1994

[54] LUBRICATION MECHANISM FOR ANTI-FRICTION BEARINGS

[75] Inventor: James O. Gallant, Dighton, Mass.

[73] Assignee: S W Industries, Southborough, Mass.

[21] Appl. No.: 4,490

[22] Filed: Jan. 14, 1993

Related U.S. Application Data

[63] Continuation of Ser. No. 856,442, Mar. 24, 1992, abandoned.

[51] Int. Cl.⁵ .............................. F16C 33/66
[52] U.S. Cl. ...................... 384/468; 384/470; 384/472
[58] Field of Search ............ 384/468, 470, 472, 464, 384/484

[56] References Cited

U.S. PATENT DOCUMENTS

| | | |
|---|---|---|
| 1,467,686 | 9/1923 | Reynolds ............................ 384/468 |
| 1,691,015 | 11/1928 | Leister . |
| 1,701,535 | 2/1929 | Holland-Letz . |
| 1,705,281 | 3/1929 | Bott . |
| 2,219,031 | 10/1940 | Frauenthal et al. . |
| 2,380,327 | 7/1945 | Parsons . |
| 3,096,129 | 7/1963 | Hay . |
| 3,179,478 | 4/1965 | Readdy . |
| 3,243,243 | 3/1966 | Diver et al. . |
| 3,307,889 | 3/1967 | Grange . |
| 3,350,147 | 10/1967 | Hingley . |
| 3,383,146 | 5/1968 | Haller . |
| 3,450,449 | 6/1969 | Sibley et al. . |
| 3,539,231 | 11/1970 | Langstrom . |
| 3,597,031 | 8/1971 | Bill . |
| 3,628,835 | 12/1971 | Cornish et al. . |
| 3,628,839 | 12/1971 | Vannest . |
| 3,645,592 | 2/1972 | Flandrena . |
| 3,753,605 | 8/1973 | Lehmann ............................ 384/465 |
| 4,082,381 | 4/1978 | Simmons et al. . |
| 4,133,588 | 1/1979 | Earsley . |
| 4,181,379 | 1/1980 | Letts . |
| 4,199,203 | 4/1980 | Pearson . |
| 4,240,679 | 12/1980 | Schnoll . |
| 4,345,799 | 8/1982 | Crofts . |
| 4,353,605 | 10/1982 | Chiba et al. . |
| 4,391,476 | 7/1983 | Negele et al. . |
| 4,400,040 | 8/1983 | Toth et al. . |
| 4,714,358 | 12/1987 | Bayer et al. . |
| 4,787,757 | 11/1988 | Finger . |
| 4,874,260 | 10/1989 | Podhajecki . |
| 4,902,145 | 2/1990 | Johnson . |
| 4,915,515 | 4/1990 | Rohrer et al. ..................... 384/470 |
| 4,932,500 | 6/1990 | Smith et al. . |
| 4,940,341 | 7/1990 | Schuetz et al. . |
| 4,941,759 | 7/1990 | Creschmann et al. . |
| 5,150,975 | 9/1992 | Major et al. ....................... 384/468 |

Primary Examiner—Lenard A. Footland
Attorney, Agent, or Firm—Lawrence J. Shurupoff

[57] ABSTRACT

A high speed anti-friction bearing includes an internal impeller mechanism to provide improved high speed lubrication for the anti-friction elements. At high bearing speeds the impeller mechanism scoops liquid lubricant from a liquid annulus centrifugally generated on the outer wall of the bearing. The scooped liquid is hurled inwardly onto the anti-friction elements as a fine mist. The bearing lubrication process is achieved with minimum heat generation and minimum energy loss insofar as the anti-friction elements do not plow through large masses of lubricant.

15 Claims, 3 Drawing Sheets

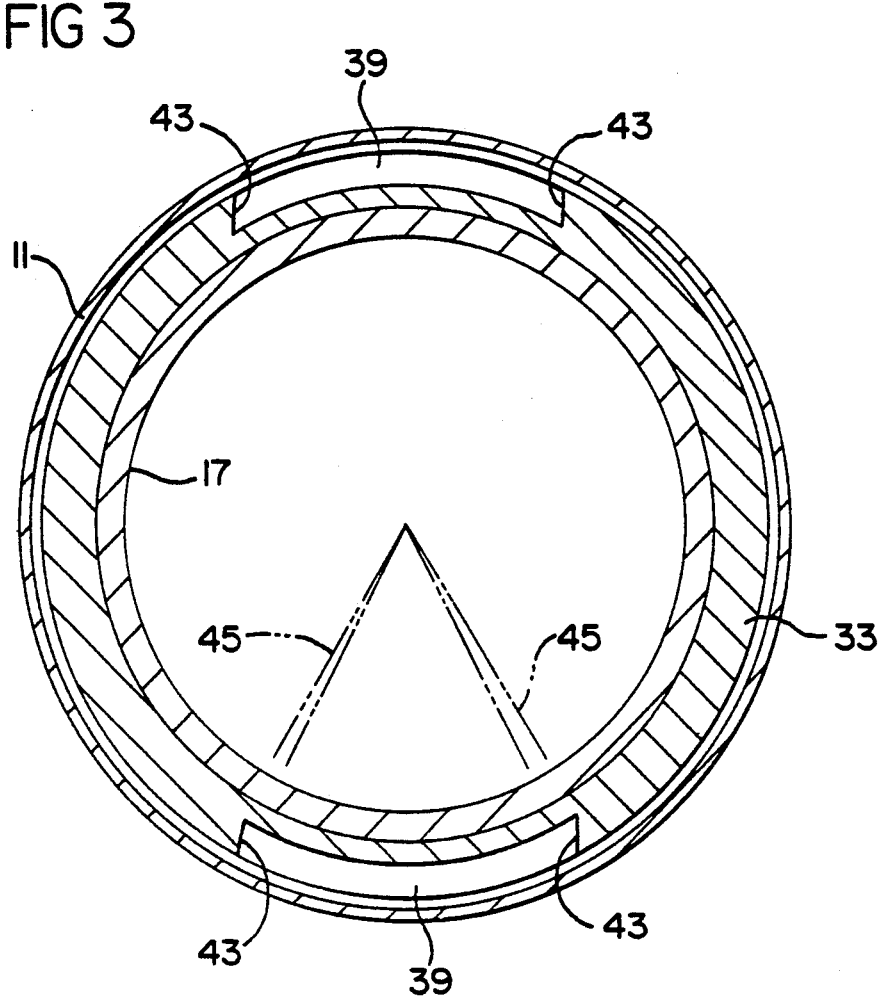
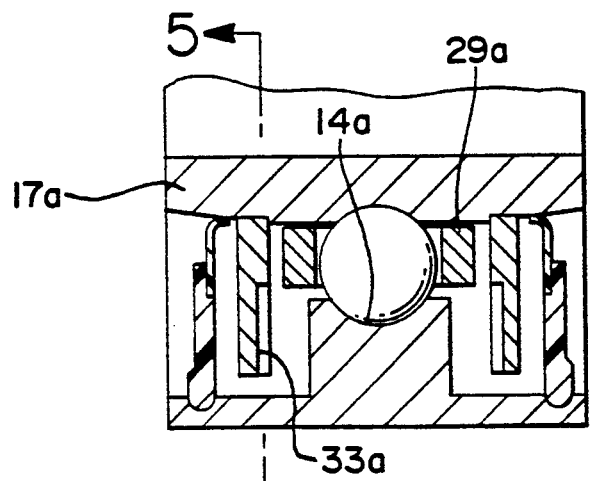

LUBRICATION MECHANISM FOR ANTI-FRICTION BEARINGS

This is a continuation of co-pending application Ser. No. 856,442 filed on Mar. 24, 1992 abandoned.

BACKGROUND OF THE INVENTION

1. Field of the Invention

This invention relates to anti-friction bearings, and particularly to mechanisms for supplying liquid lubricant to the anti-friction elements. In a preferred embodiment of the invention, the bearing is a sealed bearing assembly having a self-contained supply of lubricant.

2. Description of Prior Developments

It is known to provide lubrication systems for anti-friction bearings. One problem with many lubricated bearings is that during high speed bearing operation the lubricant tends to be centrifugally thrown radially outwardly against the bearing outer wall. The lubricant forms an outer lubricant ring or liquid annulus spaced away from the anti-friction elements. The anti-friction elements become starved of lubricant.

The lubricant starvation problem can at least partly be solved by more completely filling the bearing with lubricant, i.e. by adding enough lubricant so that the anti-friction elements are continually immersed in lubricant, even when the lubricant is centrifugally formed into a lubricant annulus. However, with a greater quantity of lubricant in the bearing, the anti-friction elements and associated separator or spacer are required to plow through the lubricant mass. The bearing thus requires a greater amount of energy to achieve a given shaft rotational speed.

The higher energy requirement is particularly noticeable during high speed operation during which the energy is translated into objectionable heat in the lubricant and in the bearing elements. Adequate dissipation of the excessive heat is sometimes a problem.

The present invention is concerned with a high speed bearing assembly adapted to use a relatively small quantity of liquid lubricant, but without experiencing the above-mentioned lubricant starvation problem associated with centrifuging of the lubricant into an unusable lubricant annulus. The present invention employs an impeller or scoop arranged to extend a slight distance into the lubricant annulus for hurling the scooped liquid radially inwardly toward the anti-friction elements.

The dynamics are such that the hurled liquid is in the form of a mist of fine droplets. The liquid mist efficiently lubricates the rolling elements without creating significant internal heating of the rolling elements. The rolling elements do not have to plow through a continuous liquid lubricant mass, which would necessitate a high energy expenditure and create a turbulent fluid shear heating of the lubricant.

The use of a liquid scoop means in a lubricated bearing is shown in U.S. Pat. No. 3,753,605 to K. G. Lehmann. The Lehmann patent uses anti-friction element spacer blocks 16 that have angled shoulder surfaces 36 adapted to scoop and deflect liquid lubricant radially inwardly against an inner race 12. The deflected liquid then flows radially outwardly through passages 44 in the spacer blocks, thence through a slot-like passage 42 onto the surface of anti-friction ball element 14.

One disadvantage of the Lehmann arrangement is that the scoop shoulders 36 are within the rolling plane of rolling elements 14 and remote from the outer race 10. The liquid annulus has to form a relatively thick layer on the race 10 surface before the scoop shoulders can engage the liquid annulus. Also, the scooped liquid is required to take a relatively long circuitous route through passages 44 and 42 before reaching the ball element surface. The lubricant passages 42 and 44 will exert sufficient frictional resistance on the flowing liquid that the liquid is in a continuous state when it comes into contact with the ball 14 surface. Lubricant is supplied to the ball surface as a solid liquid stream, not as a mist of fine liquid droplets.

The physical construction of the Lehmann lubricant-distributing mechanism is such that a relatively large quantity of lubricant has to be charged into the bearing assembly before the scoop shoulders 36 can engage the liquid annulus and pump liquid lubricant onto the ball element surfaces. The ball elements have to plow through a substantial quantity of liquid during high speed operation and during low speed operation.

SUMMARY OF THE INVENTION

The present invention is directed in general to bearing lubrication. Although the invention is not limited to any specific bearing application, in the illustrated embodiments a high speed bearing assembly includes inner and outer race surfaces which support the rolling anti-friction elements. The race surfaces are located radially inwardly from an outer wall portion of the outer race which forms a lubricant retention surface within the bearing assembly.

During high speed operation, an annulus of liquid lubricant is centrifugally formed on the inner surface of the bearing outer wall such that the inner and outer race surfaces which engage the anti-friction elements are spaced inwardly from the liquid annulus. A liquid impeller extends radially outwardly alongside the outer race into the liquid annulus so that the impeller deflects some of the liquid annulus radially inwardly into direct contact with the anti-friction elements located between the inner and outer races.

The fluid path from the liquid annulus to the anti-friction elements is relatively short and direct, without any frictional drag action on the deflected liquid. At high rotational speeds, deflected liquid is in the form of a fine spray of droplets.

Bearing assemblies of the type to which the present invention is directed operate at high speed, with a minimum quantity of lubricant and with minimum energy expenditure and minimum heat generation.

THE DRAWINGS

FIG. 3 is a sectional view taken on line 3—3 in FIG. 2 reduced to the scale of FIG. 1.

FIG. 4 is a sectional view taken in the same direction as FIG. 2, but through a second embodiment of the invention.

DESCRIPTION OF A PREFERRED EMBODIMENT OF THE INVENTION

Figure 1:
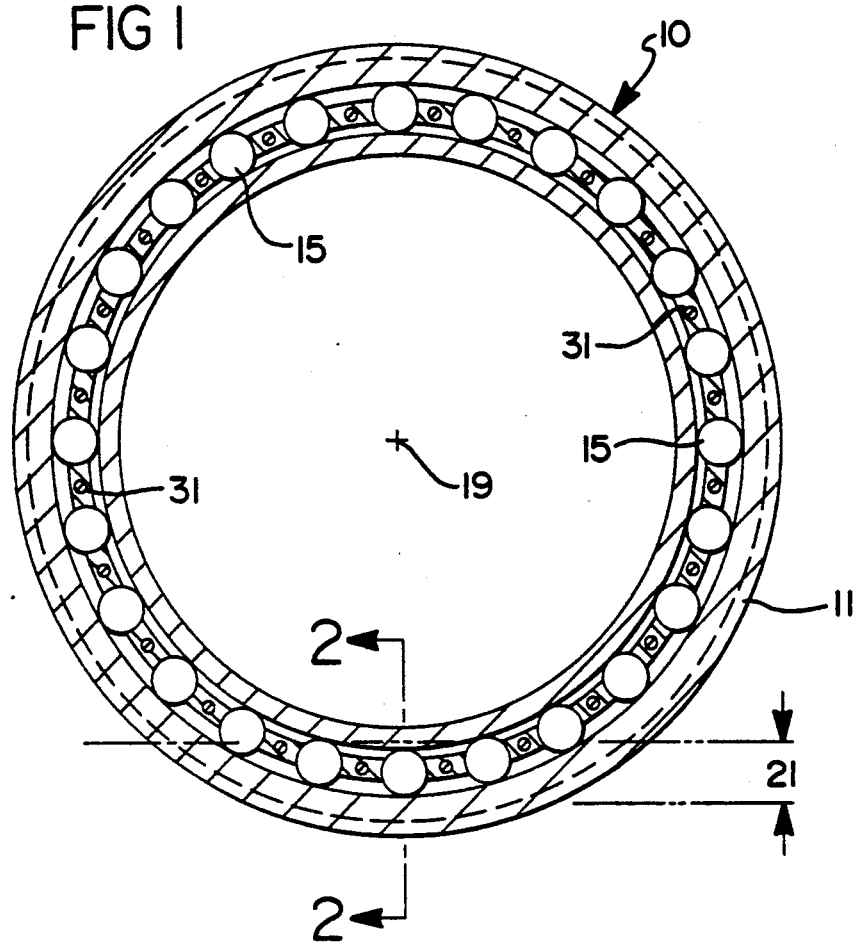
FIG. 1 is a transverse sectional view through a bearing assembly embodying this invention.
Figure 2:
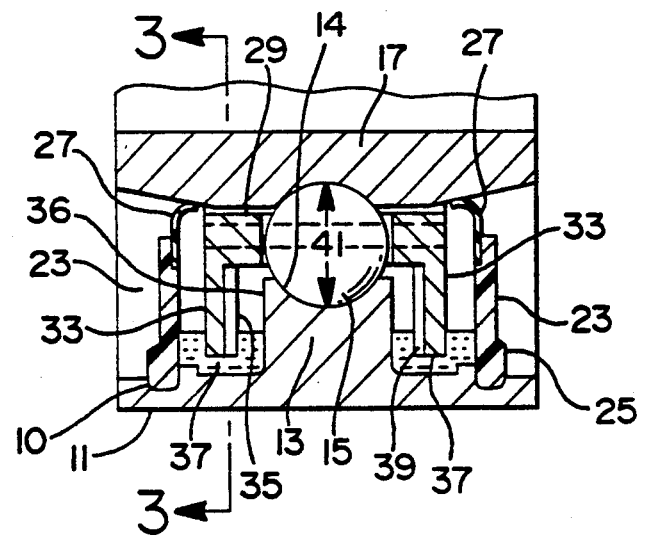
FIG. 2 is an enlarged fragmentary sectional view taken on line 2—2 in FIG. 1.

FIGS. 1 and 2 show an anti-friction bearing assembly that includes an outer race 10 which includes an outer axial wall 11 and an inwardly-extending central section 13 that defines an outer race surface 14 for engaging and supporting a plurality of rolling anti-friction elements 15. FIG. 2 illustrates the cross-sectional configuration of the outer annular wall 11, the central section 13, and the outer race surface 14 of outer race 10.

An inner race 17 is arranged within the outer race for relative rotation around a central rotational axis 19 (FIG. 1). Either race can be stationary with the other race being rotary. A quantity of liquid lubricant is initially charged into the bearing assembly to partially fill the annular space between the inner surface of outer wall 11 and inner race 17.

Dimensional line 21 in FIG. 1 indicates approximately the liquid level that would be achieved if the bearing assembly were oriented with its axis 19 horizontal and the bearing assembly in a stationary mode. Only a small portion of the bearing assembly space is occupied by the liquid.

The lubricating liquid is contained within the bearing assembly by two similar sealing members 23. Each sealing member includes a relatively stiff annular disk 25 having its outer edge seated in an annular groove in outer wall 11. A relatively thin flexible sealing lip 27 is carried by disk 25 for sliding sealing contact with the inner race 17. The two sealing members are axially spaced so that the two races and anti-friction elements are located between the sealing members.

Anti-friction elements 15 are circumferentially spaced apart by an annular separator 29, preferably formed as two similar half sections. Each half section has an array of semi-circular grooves formed therein for partial encirclement of the anti-friction ball elements. When the two half sections are secured together, as by rivets 31, the grooves mate to form circular holes encircling the anti-friction ball elements.

The separator half sections have similar flat radial walls 33 extending radially outwardly alongside the central section 13 of outer race 10, as shown in FIG. 2. Each radial wall 33 is in the form of an annular disk-like wall extending entirely around and along the separator. Each wall 33 has a flat side surface 35 facing the central section 13 of outer race 10 but axially spaced a slight distance away from the side wall surface 36 of central section 13.

The outer circumferential edge 37 of each radial wall 33 is in near proximity to outer wall 11. However, there is an annular clearance sufficient to permit lubricating liquid to flow along the inner surface of wall 11 through the plane of each wall 33.

As an important feature of the invention, each wall 33 has at least two liquid impeller surfaces such as defined by cavities or recesses 39 inset into the side surface 35 of each wall 33 facing the side wall surface 36 of outer race 10 and the ball elements. Each impeller surface defined by each recess 39 extends from the outer edge 37 of wall 33 to a point in axial alignment with the ball elements and rolling region of ball elements 15. The term "rolling region" is here used to indicate a radial region 41 taken through a representative ball element between the opposing race surfaces.

During high speed rotation of the bearing assembly, e.g., at speeds above approximately 12,000 linear feet per minute of the outer diameter of the outer race 10, a liquid lubricant annulus will form on the interior surface of outer wall 11. In FIG. 2, the liquid annulus is indicated generally by the dashed lines. Each radial wall 33 is dimensioned so that its outer edge 37 is immersed in the liquid annulus.

Each cavity or recess 39 acts as an impeller or scoop to hurl liquid inwardly into contact with the anti-friction elements 15. The path taken by the liquid has a cross-section much larger than the corresponding dimensions of the impeller cavities. Therefore the liquid separates into tiny droplets, such that the anti-friction elements are subjected to a mist-type lubrication action. In this manner, comparatively small quantities of lubricant are needed to provide full lubrication to the anti-friction elements during high speed rotation.

As shown in FIG. 3, there are two diametrically-spaced impeller recesses 39 formed in radial wall 33. Each recess includes an edge or end surface 43 that acts as an impeller surface to scoop liquid from the liquid annulus and direct it inwardly along the recess toward the ball elements 15. The outer edge of each impeller surface 43 is radially offset from its inner edge by a slight amount, as indicated by the radial lines 45 in FIG. 3, whereby the scooped liquid is given its inward radial motion component.

As shown in FIG. 3, each recess 39 has two end (scoop) surfaces 43 facing in opposite directions. Each surface 43 is operative for a given rotational direction of the bearing or a given liquid annulus velocity That is, one impeller surface will be operative for a clockwise motion of the bearing, and the other impeller surface will be operative for a counter-clockwise rotation of the bearing. In each case, the outer edge of impeller surface 43 is circumferentially advanced relative to the inner edge in order to provide the inward impetus for the scooped liquid.

The mist-type lubrication is achieved whether the outer wall 11 is rotating or stationary. In either case, the high speed rotation of the rotating elements 15 and 29 centrifugally create the liquid annulus on wall 11. The impeller or scoop action occurs as a result of a velocity differential between each wall 33 and the liquid annulus. Wall 33 can be moving faster or slower than the annulus so that the annulus either runs into the impeller recesses to create the inwardly directed liquid spray, or the impeller recesses overtake the liquid annulus to achieve the scoop action.

The mist-type lubrication is achieved only at relatively high bearing speeds. At lower speeds, the velocity differential between impeller walls 33 and the liquid annulus is either too small, in which case the lubrication is more in the nature of splash-type lubrication, or there is no liquid annulus formed on wall 11. In the latter case, the anti-friction elements merely pass through a relatively stationary liquid pool. The principal advantage of this invention is realized during high speed operations when the impeller walls 33 are able to generate a fine lubricant mist for spray type application to the anti-friction elements.

Figure 5:
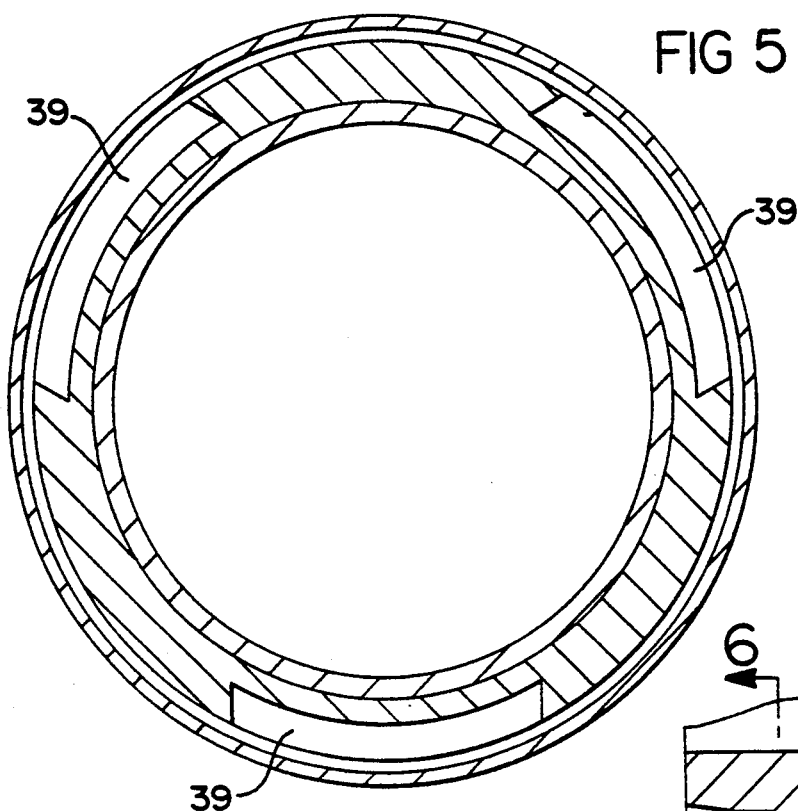
FIG. 5 is a sectional view taken in the same direction as FIG. 3, but along line 5—5 in FIG. 4.

FIGS. 4 and 5 illustrate a second form that the invention can take. In this case, the radial walls 33a are mounted on inner race 17 instead of on separator 29. The radial walls operate in essentially the same fashion as previously described. A conventional annular separator 29(a), spaced apart from radial walls 33a, may be employed in this configuration.

FIG. 5 shows the impeller wall 33a as having three impeller recesses 39 rather than two recesses. In practice of the invention, at least two impeller recesses should be used in order to maintain the bearing in dynamic balance.

Figure 7:
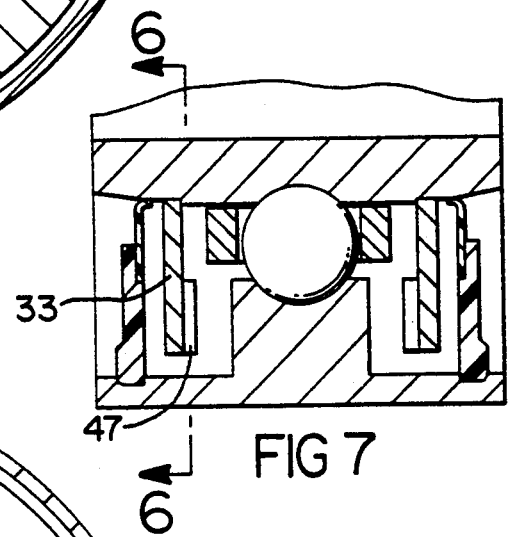
FIG. 7 is a sectional view similar to FIG. 4 showing the use of paddle-type impellers.
Figure 6:
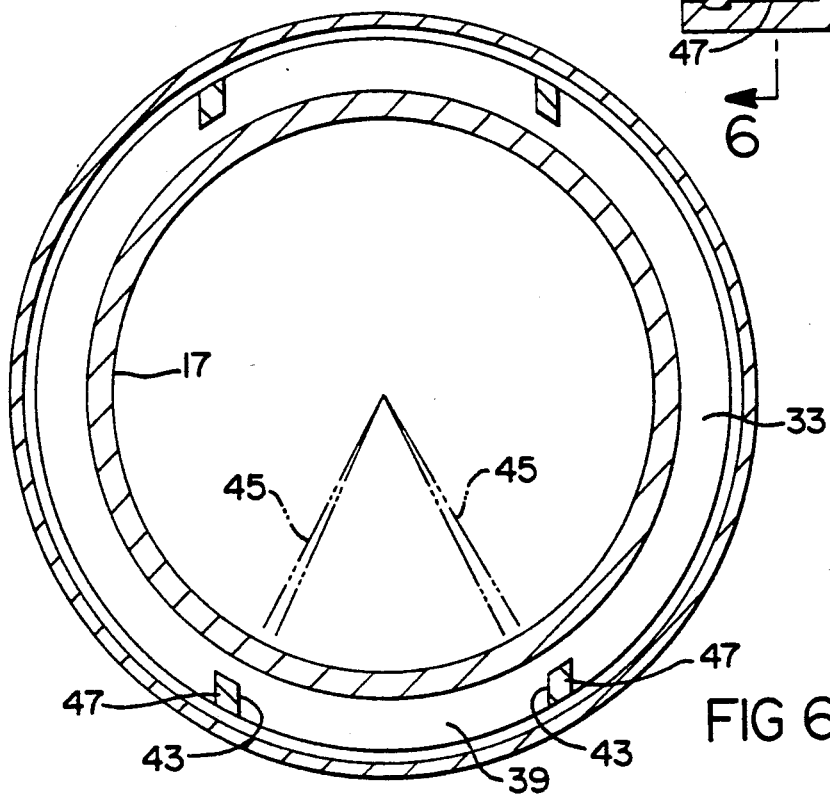
FIG. 6 is a sectional view similar to FIG. 5 showing another embodiment of the invention taken along line 6—6 of FIG. 7.

The drawings necessarily show specific structures and configurations, e.g., specific types of anti-friction elements 15 and sealing members 23. However, it will be appreciated that some changes and variations can be resorted to while still practicing the invention. For example, as seen in FIGS. 6 and 7, scoop or impeller surfaces 43 may be formed as discrete paddles 47 which project axially inwardly from each radial wall 33. Paddles 47 function in the same manner and may have the same location and surface contours as the end surfaces 43 of impeller recesses 39 described above.

What is claimed is:

1. A bearing assembly comprising an inner race, an outer race, a plurality of rolling anti-friction elements disposed between said inner and outer races, and impeller means disposed between said inner and outer races adjacent to said rolling elements, said impeller means extending radially outwardly beyond said rolling elements for directing lubricant from a location alongside said outer race to a location adjacent said inner race.

2. The bearing assembly of claim and further comprising an annular separator for circumferentially spacing said rolling elements, said impeller means being carried by said separator.

3. The bearing assembly of claim 2, wherein said separator comprises a first axially-extending wall having holes formed therein encircling said rolling elements, and a second radially-extending wall extending outwardly from said first wall; said impeller means comprising at least two recesses formed in said radially-extending wall.

4. The bearing assembly of claim 3, wherein said radially-extending wall has a side surface facing said rolling elements and a circumferential outer edge, each said recess being inset into said side surface; each recess extending radially inwardly from said outer edge to a point within the roll plane of the rolling elements; each recess having an impeller surface with an outer edge radially offset from an inner edge in a direction whereby lubricant contacted by said impeller surface is deflected radially inwardly.

5. The bearing assembly of claim 1, and further comprising two axially-spaced sealing members extending between said inner and outer races alongside said rolling elements; said rolling elements and said impeller means being located between said two sealing members.

6. The bearing assembly of claim 1, wherein said impeller means comprises two axially-spaced radial walls extending on opposite sides of said rolling elements; each radial wall having a side surface facing said rolling elements, and a circumferential outer edge; said impeller means comprising at least two recesses formed in said side surface of each radial wall; each recess extending radially inwardly from said outer edge to a point in axial alignment with said rolling elements; each recess comprising an impeller surface having an outer edge circumferentially advanced relative to an inner edge thereof, such that lubricant contacted by said impeller surface is directed radially inwardly.

7. The bearing assembly of claim 6, and further comprising an annular separator for circumferentially spacing said rolling elements; said radial walls being carried by said separator.

8. The bearing assembly of claim 6, and further comprising an annular separator for circumferentially spacing said rolling elements; said radial walls being spaced from said annular separator and affixed to said inner race so that said annular separator is disposed between said radial walls.

9. A high speed bearing assembly comprising an inner race; an outer race; a plurality of rolling elements disposed between said inner and outer races; a support surface formed on said outer race for engaging and supporting said rolling elements; a fluid lubricant disposed between said inner and outer races; and lubricant distributing means disposed adjacent said rolling elements and having at least one scoop means extending radially outward beyond said support surface for engaging an annular layer of said lubricant alongside said outer race and for hurling said lubricant from said layer inwardly toward said rolling elements.

10. The bearing assembly of claim 9, and further comprising an outer axial wall encircling said outer race, said outer race comprising a central portion projecting radially inwardly from said outer wall; said scoop means extending alongside said central portion of said outer race into near proximity to said outer wall, such that said scoop means is enabled to extend into said layer of lubricant.

11. The bearing assembly of claim 10, wherein said lubricant distributing means comprises two axially-spaced scoop means; each scoop means being disposed in facing relation to said central portion of said outer race, with the rolling elements being located between said two scoop means so that lubricant is propelled onto said rolling elements from two directions.

12. The bearing assembly of claim 11, and further comprising two axially-spaced sealing members extending between said outer annular wall and said inner race; said rolling elements and said lubricant distributing means being located between said two sealing members, such that said sealing members confine said lubricant to an annular zone traversed by said rolling elements and said lubricant distributing means.

13. A high speed bearing assembly comprising an outer annular wall; an outer race projecting radially inwardly from said outer annular wall; an inner race spaced radially inwardly from said outer race; anti-friction ball elements rollably engaging said inner and outer races; two axially-spaced sealing members extending from said outer annular wall to said inner race, said ball elements and said outer race being located between said two sealing members; a quantity of liquid lubricant disposed in a space defined by said two sealing members; and two flat annular radial walls located between said ball elements and respective ones of said sealing members; each flat radial wall having a side surface facing said ball elements, and an outer circumferential edge in near proximity to said outer annular wall; each side surface having impeller means extending radially inwardly from its associated outer edge, such that said impeller means are enabled to direct lubricant from said outer annular wall into contact with said ball elements.

14. The bearing assembly of claim 13, and further comprising an annular separator for said ball elements; said flat radial walls being attached to opposite ends of said separator.

15. The bearing assembly of claim 13, and further comprising an annular separator for said ball elements; said flat radial walls extending radially outwardly from said inner race such that said separator is located between said flat radial walls.

* * * * *